US011928912B2

(12) United States Patent
Lee et al.

(10) Patent No.: US 11,928,912 B2
(45) Date of Patent: Mar. 12, 2024

(54) AUTOMATIC HEATING VENDING MACHINE

(71) Applicant: Hillever Innovation Technology Corporation, New Taipei (TW)

(72) Inventors: Han-Hui Lee, New Taipei (TW); Meng-Hsuan Lee, New Taipei (TW); Ming-Tse Lee, New Taipei (TW)

(73) Assignee: Hillever Innovation Technology Corporation, New Taipei (TW)

( * ) Notice: Subject to any disclaimer, the term of this patent is extended or adjusted under 35 U.S.C. 154(b) by 171 days.

(21) Appl. No.: 17/563,212

(22) Filed: Dec. 28, 2021

(65) Prior Publication Data

US 2022/0207955 A1 Jun. 30, 2022

(30) Foreign Application Priority Data

Dec. 29, 2020 (TW) ................................ 109146703

(51) Int. Cl.
*G07F 17/00* (2006.01)
*G07F 11/10* (2006.01)
(Continued)

(52) U.S. Cl.
CPC .......... *G07F 17/0078* (2013.01); *G07F 11/10* (2013.01); *G07F 11/163* (2020.05); *G07F 11/22* (2013.01); *G07F 11/72* (2013.01)

(58) Field of Classification Search
CPC ...... G07F 17/008; G07F 11/163; G07F 11/10; G07F 11/22; G07F 11/72; G07F 17/0078;
(Continued)

(56) References Cited

U.S. PATENT DOCUMENTS 5,105,979 A * 4/1992 Bakx .................. G07F 17/0078 99/357
5,322,187 A * 6/1994 Zizola .................... A23G 9/288 221/256
(Continued)

FOREIGN PATENT DOCUMENTS

CN 208796377 U * 4/2019 ......... G07F 17/0085
CN 209087052 U 7/2019
(Continued)

*Primary Examiner* — Rakesh Kumar
(74) *Attorney, Agent, or Firm* — Best & Flanagan LLP

(57) ABSTRACT

An automatic heating vending machine including a storage space, a storage mechanism, a fetching mechanism, a gripping arm mechanism, a rotating disc mechanism and a heating mechanism are disclosed. The storage mechanism is installed in the storage space to store food. The fetching mechanism is installed in the storage space and disposed under the storage mechanism to catch the food. The gripping arm mechanism grips the food on the fetching mechanism. The rotating disc mechanism is disposed on one side of the gripping arm mechanism. The gripping arm mechanism grips the food and then places the food on the rotating disc mechanism. The heating mechanism is disposed above the rotating disc mechanism. After the food has been placed on the rotating disc mechanism, the rotating disc mechanism undergoes horizontal movement and vertical movement, allowing the food to be admitted to the heating mechanism and heated.

9 Claims, 12 Drawing Sheets

(51) Int. Cl.
*G07F 11/16* (2006.01)
*G07F 11/22* (2006.01)
*G07F 11/72* (2006.01)

(58) Field of Classification Search
CPC ..... A61B 5/1117; A61B 5/0022; A61B 5/024; G16H 40/67; G16H 40/63; G16H 20/13
USPC ....................................... 221/150 R; 700/237
See application file for complete search history.

(56) References Cited

U.S. PATENT DOCUMENTS

| | | | | | |
|---|---|---|---|---|---|
| 5,449,888 | A * | 9/1995 | Smith | G07F 9/105 219/400 |
| 5,582,758 | A * | 12/1996 | Smith | H05B 6/6473 219/400 |
| 5,799,822 | A * | 9/1998 | Rudewicz | H05B 6/808 219/678 |
| 5,878,910 | A | 3/1999 | Gibernau et al. | |
| 6,072,163 | A * | 6/2000 | Armstrong | H01L 21/67103 118/724 |
| 6,464,104 | B1 * | 10/2002 | Waddell | G07F 17/0078 221/150 A |
| 8,234,972 | B2 * | 8/2012 | Sands | A47J 37/044 221/150 HC |
| 2001/0002674 | A1 * | 6/2001 | Gubbini | A21C 9/08 221/13 |
| 2012/0263847 | A1 * | 10/2012 | Poli | G07F 9/105 426/520 |
| 2014/0224826 | A1 * | 8/2014 | Otzen | G07F 11/10 221/1 |
| 2019/0139353 | A1 * | 5/2019 | Barnum | G07F 9/105 |
| 2021/0012606 | A1 * | 1/2021 | Barnum | F25D 31/005 |
| 2022/0207955 | A1 * | 6/2022 | Lee | G07F 11/163 |

FOREIGN PATENT DOCUMENTS

| | | | | |
|---|---|---|---|---|
| CN | 209087052 U * | 7/2019 | G07F 11/54 |
| CN | 209640989 U | 11/2019 | |
| CN | 209640989 U * | 11/2019 | G07F 11/23 |
| EP | 482245 A * | 4/1992 | F25D 23/12 |
| EP | 1107199 A2 * | 6/2001 | A21C 9/08 |
| GB | 2310990 A * | 9/1997 | G07F 17/0078 |
| JP | S5269995 S | 5/1977 | |
| JP | S60104983 U | 7/1985 | |
| JP | H10506491 A | 6/1998 | |
| KR | 20090073320 A * | 3/2009 | G07F 17/0078 |
| WO | WO-9207340 A1 * | 4/1992 | G07F 17/0078 |
| WO | WO-9704427 A1 * | 2/1997 | G07F 11/16 |
| WO | WO-02086827 A2 * | 10/2002 | G07F 11/14 |
| WO | WO-2004023408 A1 * | 3/2004 | G07F 11/54 |
| WO | WO-2005015509 A1 * | 2/2005 | G07F 17/0078 |
| WO | WO-2011045662 A1 * | 4/2011 | G07F 11/26 |
| WO | WO2019152580 A1 | 8/2019 | |
| WO | WO-2019152580 A1 * | 8/2019 | G07F 11/54 |

* cited by examiner

AUTOMATIC HEATING VENDING MACHINE

BACKGROUND OF THE INVENTION

Field of the Invention

The present invention relates to automatic heating vending machines and, more particularly, to an automatic heating vending machine capable of heating foods directly.

Description of the Prior Art

In a modern society, peoples demand for foods is based not only on an aversion to hunger but also on the flavor and nutrients of foods. Owing to technological advancement, people who are busy want to have quick, convenient access to foods; to this end, automatic vending machines offer a solution. However, the automatic vending machines of the prior art have can only offer cold food or hot food. Thus, the user will have fewer choices. Besides, if the user wants to eat hot food, the user have to heat it himself, thereby incurring inconvenience.

Therefore, it is necessary to provide an automatic heating vending machine to overcome the aforesaid drawback of the prior art.

SUMMARY OF THE INVENTION

It is an objective of the present invention to provide an automatic heating vending machine capable of heating foods directly.

In order to achieve the above and other objectives, the present invention provides an automatic heating vending machine comprising a storage space, storage mechanism, fetching mechanism, gripping arm mechanism, rotating disc mechanism and heating mechanism. The storage mechanism is installed in the storage space to store a food. The fetching mechanism is installed in storage space and disposed under storage mechanism to catch the food released from the storage mechanism. The gripping arm mechanism is disposed on one side of the fetching mechanism to grip the food on the fetching mechanism. The rotating disc mechanism is disposed on one side of the gripping arm mechanism to undergo horizontal movement and vertical movement. After gripping the food, the gripping arm mechanism places the food at the rotating disc mechanism. The heating mechanism is disposed above the rotating disc mechanism. After the food has been placed on the rotating disc mechanism, the rotating disc mechanism undergoes horizontal movement and vertical movement to allow the food to be admitted to the heating mechanism and heated.

DETAILED DESCRIPTION OF THE EMBODIMENTS

The technical features are hereunder illustrated with specific embodiments.

Figure 1:
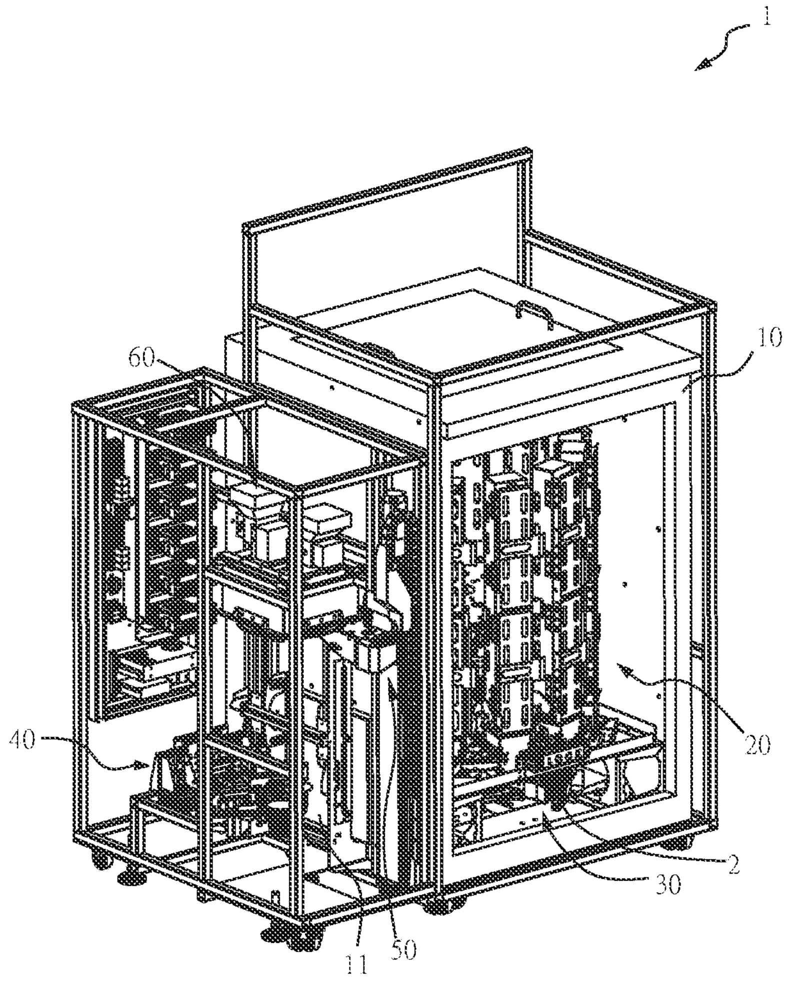
FIG. 1 is a schematic view of an automatic heating vending machine of the present invention.

Referring to FIG. 1, which is a schematic view of an automatic heating vending machine of the present invention. An automatic heating vending machine 1 of the present invention comprises a storage space 10, storage mechanism 20, fetching mechanism 30, gripping arm mechanism 40, rotating disc mechanism 50 and heating mechanism 60. Both the storage mechanism 20 and fetching mechanism 30 are disposed in the storage space 10. The storage space 10 is capable of lowering temperature and thus forms a refrigeration space or freezer space. The refrigeration temperature is 1~5° C., whereas the freezing temperature is −25~−18° C.; however, the present invention is not limited to these temperatures, as the temperature inside the storage space 10 may also be room temperature. The storage space 10 has an opening 11 defined between the fetching mechanism 30 and the gripping arm mechanism 40.

The storage mechanism 20 is installed in the storage space 10 and adapted to store a food 2. The fetching mechanism 30 is installed in the storage space 10 and disposed under the storage mechanism 20 to catch the food 2 released from the storage mechanism 20. The gripping arm mechanism 40 is disposed on one side of the fetching mechanism 30 and adapted to grip the food 2 on the fetching mechanism 30. The rotating disc mechanism 50 is disposed on one side of the gripping arm mechanism 40 and adapted to undergo horizontal movement and vertical movement. After gripping the food 2, the gripping arm mechanism 40 places the food 2 on the rotating disc mechanism 50. The heating mechanism 60 is disposed above the rotating disc mechanism 50. After the food 2 has been placed on the rotating disc mechanism 50, the rotating disc mechanism 50 moves horizontally and vertically upward to allow the food 2 to be admitted to the heating mechanism 60 and heated.

Figure 2A:
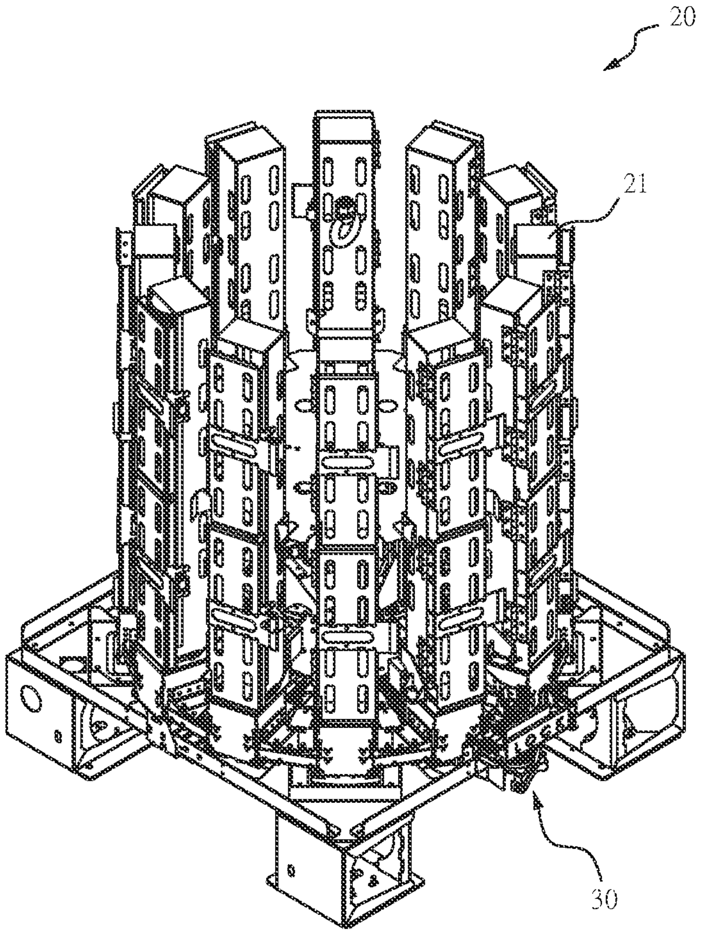
FIGS. 2A-2B are schematic structural views of a storage mechanism and a fetching mechanism of the automatic heating vending machine of the present invention.
Figure 2B:
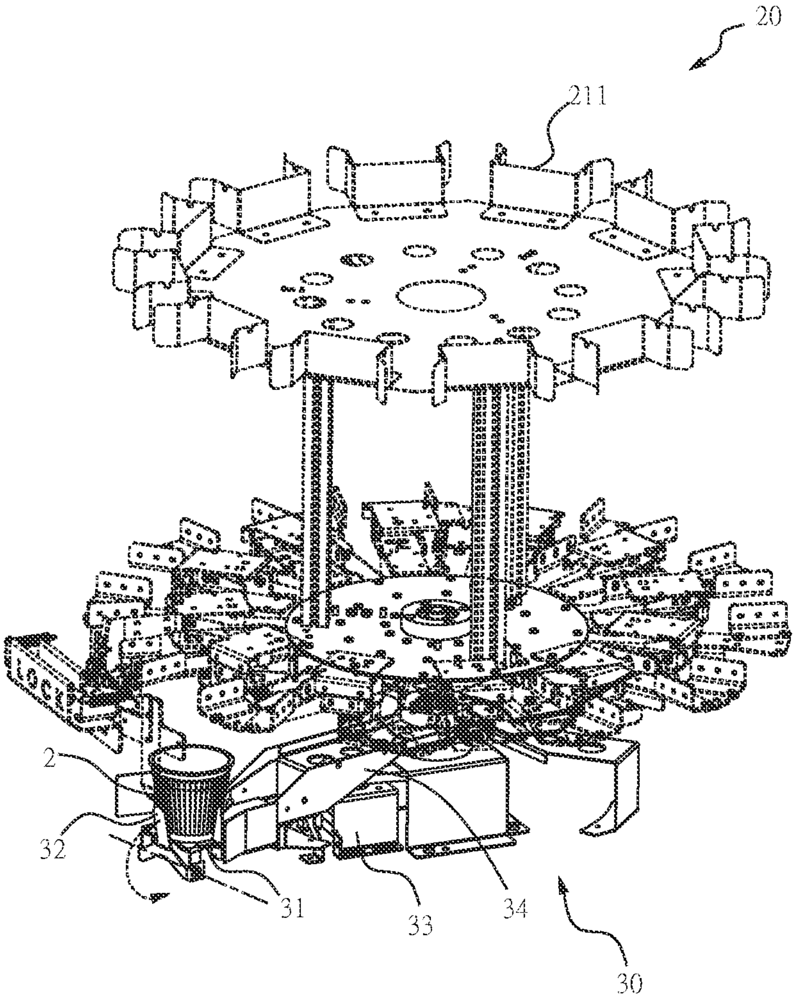

Referring to FIGS. 2A-2B, which are schematic structural views of a storage mechanism and a fetching mechanism of the automatic heating vending machine of the present invention.

The storage mechanism 20 comprises a plurality of vertical racks 21. Each vertical rack 21 holds a plurality of foods 2. For example, each vertical rack 21 holds consecutively ten foods 2. The plurality of vertical racks 21 are disposed on a ring-shaped support 211 and thus arranged in a ring-shaped pattern. The ring-shaped support 211 can also be rotated to enhance the ease of replenishing the food 2, but the present invention is not limited thereto. The fetching mechanism 30 is disposed under the support 211. The rotation of the fetching mechanism 30 and the rotation of the ring-shaped support 211 are independent of each other; thus, the rotation of the fetching mechanism 30 does not affect the ring-shaped support 211 and the plurality of vertical racks 21 above.

Figure 3A:
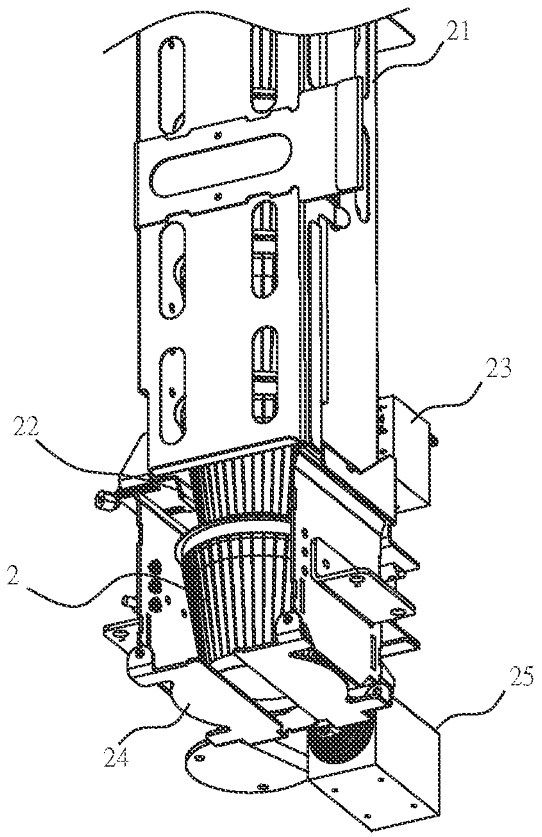
FIGS. 3A-3B are schematic views of operation of a vertical rack of the automatic heating vending machine of the present invention.
Figure 3B:
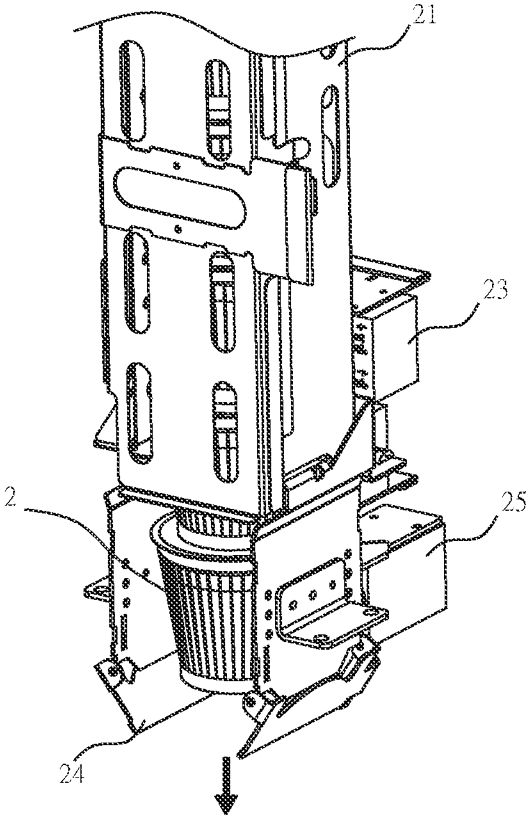

Referring to FIGS. 3A-3B, which are schematic views of operation of a vertical rack of the automatic heating vending machine of the present invention.

The storage mechanism 20 further comprises a first clamp 22, a first electromagnet 23, a second clamp 24 and a second electromagnet 25. The first clamp 22 is disposed on the vertical rack 21 and adapted to clamp the plurality of foods 2 from left and right. The first electromagnet 23 controls the first clamp 22. In one embodiment, two first electromagnets 23 (one on the left, and the other on the right) control the first clamp 22, but the present invention is not limited thereto in terms of quantity and the means of control. The second clamp 24 is disposed under the vertical rack 21 to facilitate the release of the food 2 by opening and closing. The second electromagnet 25 controls the second clamp 24 in such a way as to cause the second clamp 24 to release only one food 2 with one instance of opening and closing. Thus, the first electromagnet 23 and the second electromagnet 25 control the first clamp 22 and the second clamp 24 to release one food 2 to the fetching mechanism 30 and then control the first clamp 22 and the second clamp 24 to clamp another food 2. Therefore, the foods 2 are released, one by one, to the fetching mechanism 30.

Figure 4:
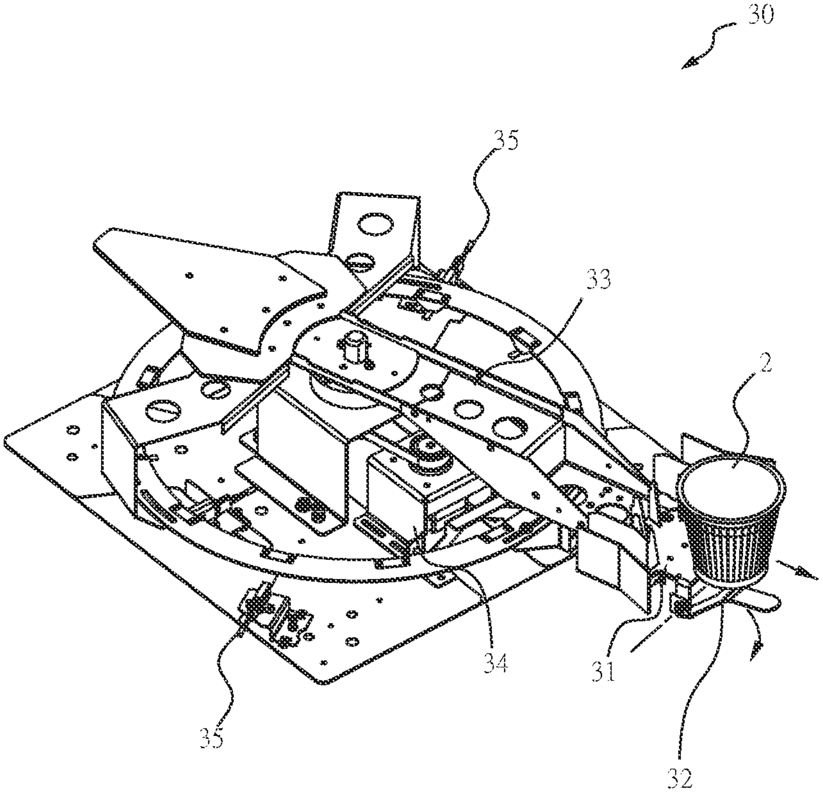
FIG. 4 is a schematic structural view of the fetching mechanism of the automatic heating vending machine of the present invention.

Referring to FIG. 4, which is a schematic structural view of the fetching mechanism of the automatic heating vending machine of the present invention.

The fetching mechanism 30 comprises a placing position 31, a blocking element 32, a rotating mechanism 33 and a first driving module 34. The placing position 31 is used for placing the released food 2. The blocking element 32 is near the placing position 31 to prevent the food 2 from sliding and falling off the placing position 31. The rotating mechanism 33 is connected to the placing position 31. The first driving module 34 is a stepper motor for driving the rotating mechanism 33 to rotate, such that the placing position 31 rotates to come into proximity to the gripping arm mechanism 40. The technology of using a motor to drive a device to rotate is well known among persons skilled in the art and thus is, for the sake of brevity, not described herein. Therefore, when a user wants to buy the food 2, the placing position 31 rotates to stay below the vertical rack 21 under the food 2 to be bought. The fetching mechanism 30 further has a plurality of first sensing modules 35 for sensing the position of the placing position 31, thereby allowing the fetching mechanism 30 to know whether it has reached the correct position. The first sensing modules 35 sense the position of the placing position 31 by infrared, visible light, image detection or with a mechanical device, such as a sheet, but the present invention is not limited thereto. When the fetching mechanism 30 rotates to reach the correct position, the first electromagnet 23 and the second electromagnet 25 control the first clamp 22 and the second clamp 24 to release the food 2, allowing the food 2 to fall onto the placing position 31. Then, the placing position 31 rotates to come into proximity to the gripping arm mechanism 40, such that the blocking element 32 can rotate, allowing the gripping arm mechanism 40 to grip the food 2 easily.

Figure 5A:
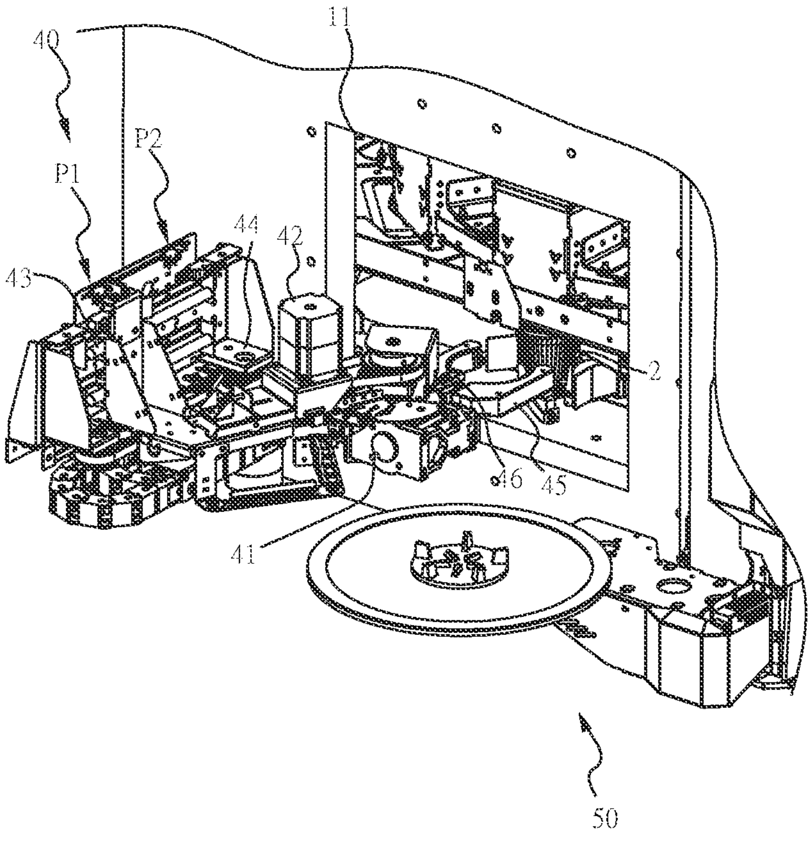
FIGS. 5A-5B are schematic views of operation of a gripping arm mechanism of the automatic heating vending machine of the present invention.
Figure 5B:
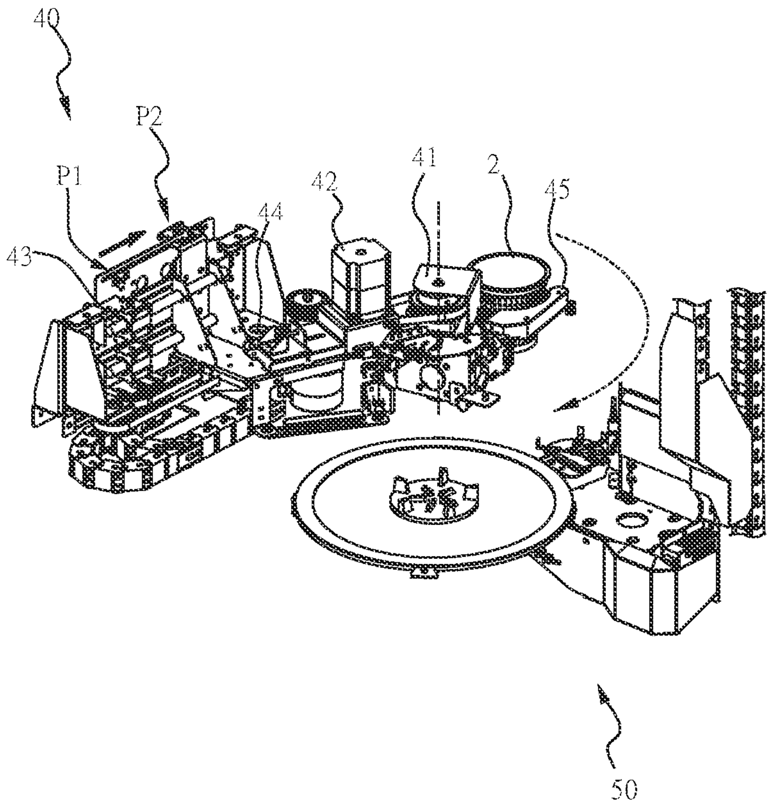

Referring to FIGS. 5A-5B, there are shown schematic views of operation of a gripping arm mechanism of the automatic heating vending machine of the present invention.

The gripping arm mechanism 40 comprises a mechanical arm 41, a second driving module 42, a rail 43 and a third driving module 44. The second driving module 42 and the third driving module 44 are stepper motors. The mechanical arm 41 is structurally designed to bend and straighten. The second driving module 42 is connected to the mechanical arm 41 to cause the mechanical arm 41 to bend and straighten. The rail 43 is connected to the mechanical arm 41. The third driving module 44 is disposed at the rail 43 and connected to the mechanical arm 41 to cause the mechanical arm 41 to move along the rail 43 between a first position P1 and a second position P2. As shown in FIG. 5A, the first position P1 is on the left of the rail 43, whereas the second position P2 is on the right of the rail 43, but the present invention is not limited thereto. Sensing modules (not shown) can be disposed on the left of the first position P1 and on the right of the second position P2 of the rail 43 to confirm that the mechanical arm 41 will not slide away beyond the first position P1 and second position P2. A jaw 45 is connected to the terminal end of the mechanical arm 41 and adapted to grip and fetch the food 2. A second sensing module 46 can be disposed near the jaw 45 to detect whether the jaw 45 is gripping the food 2. The second sensing module 46 carries out its sensing function by infrared, visible light or image detection, but the present invention is not limited thereto. Therefore, the mechanical arm 41 moves along the rail 43 from the first position P1 to the second position P2 and straightens, such that the jaw 45 can be inserted into the opening 11 to grip the food 2 on the placing position 31.

Figure 6:
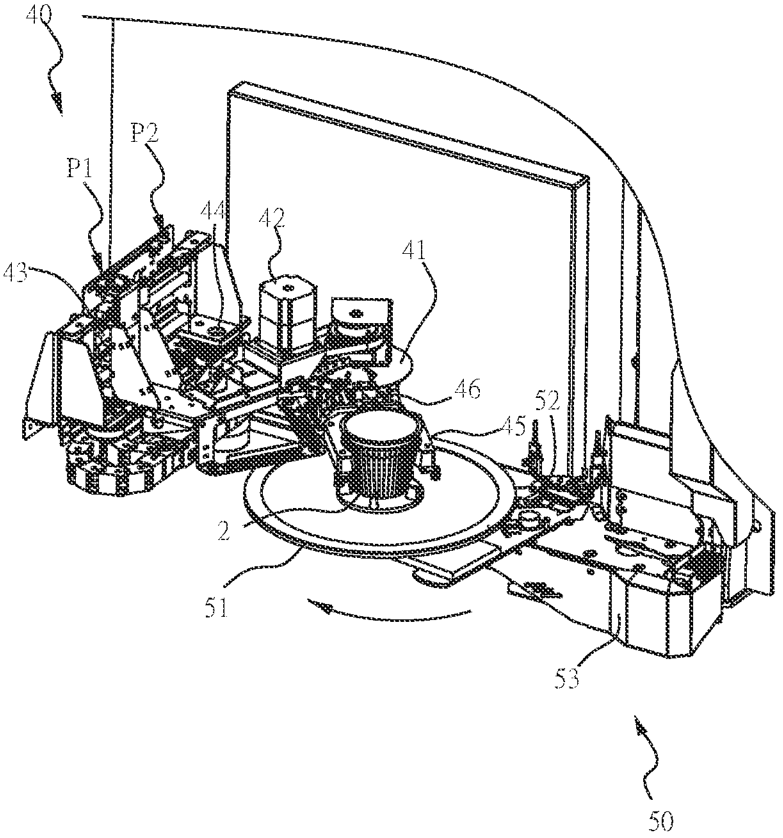
FIG. 6 is a schematic view of the automatic heating vending machine of the present invention, showing that a food is placed on a rotating disc mechanism of the automatic heating vending machine.

Referring to FIG. 6, there is shown a schematic view of the automatic heating vending machine of the present invention, showing that a food is placed on a rotating disc mechanism of the automatic heating vending machine.

The rotating disc mechanism 50 comprises a disk 51, a rotating arm 52, a fourth driving module 53, an electrically-driven rail 54 and a fifth driving module 55. The disk 51 anchors the food 2. The rotating arm 52 is connected to the disk 51. The fourth driving module 53 is a stepper motor which connects to and controls the rotating arm 52, allowing the disk 51 to move horizontally. The electrically-driven rail 54 is connected to the rotating arm 52 and extended vertically. The fifth driving module 55 is a servo motor connected to the electrically-driven rail 54 and adapted to control the electrically-driven rail 54 to drive the disk 51 and rotating arm 52 to undergo vertical movement. The jaw 45 is inserted into the opening 11 to grip the food 2 on the placing position 31. After that, the mechanical arm 41 moves along the rail 43 from the second position P2 to the first position P1 and then bends, allowing the jaw 45 to place the food 2 on the disk 51.

Figure 7:
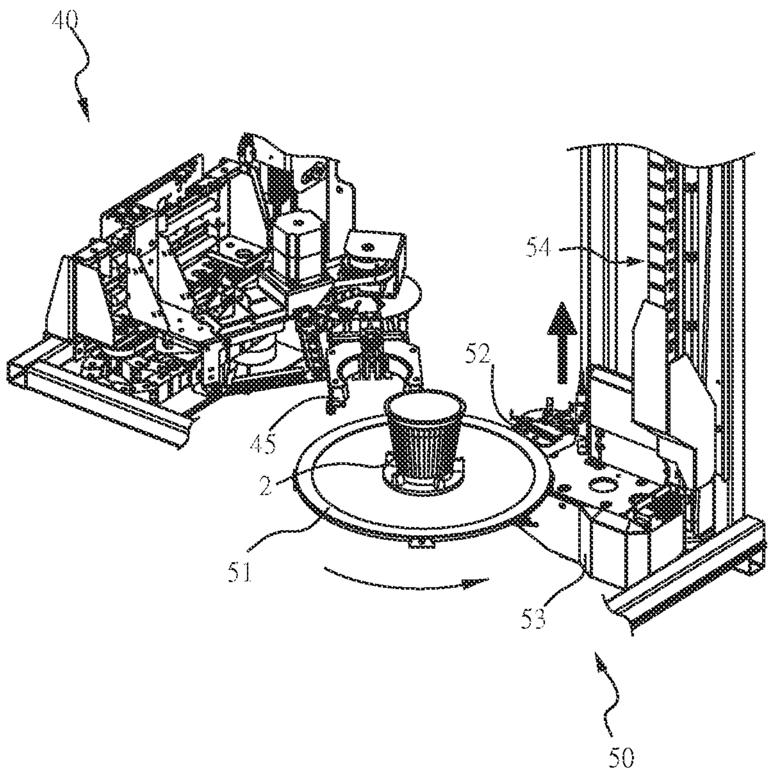
FIG. 7 is a schematic view of operation of the rotating disc mechanism of the automatic heating vending machine of the present invention.
Figure 8:
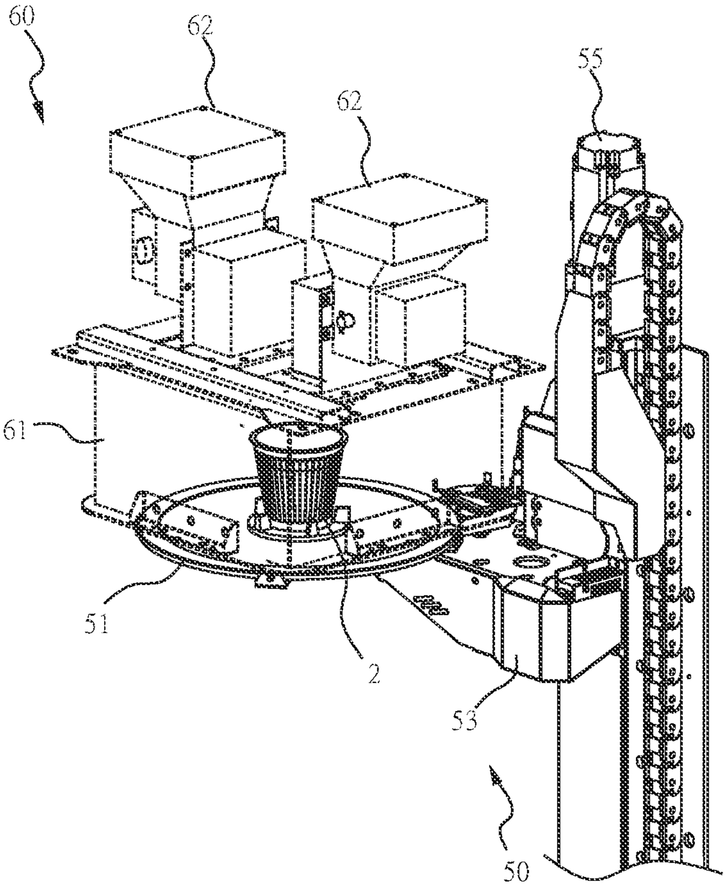
FIG. 8 is a schematic view of operation of heating the food with a heating mechanism of the automatic heating vending machine of the present invention.
Figure 9:
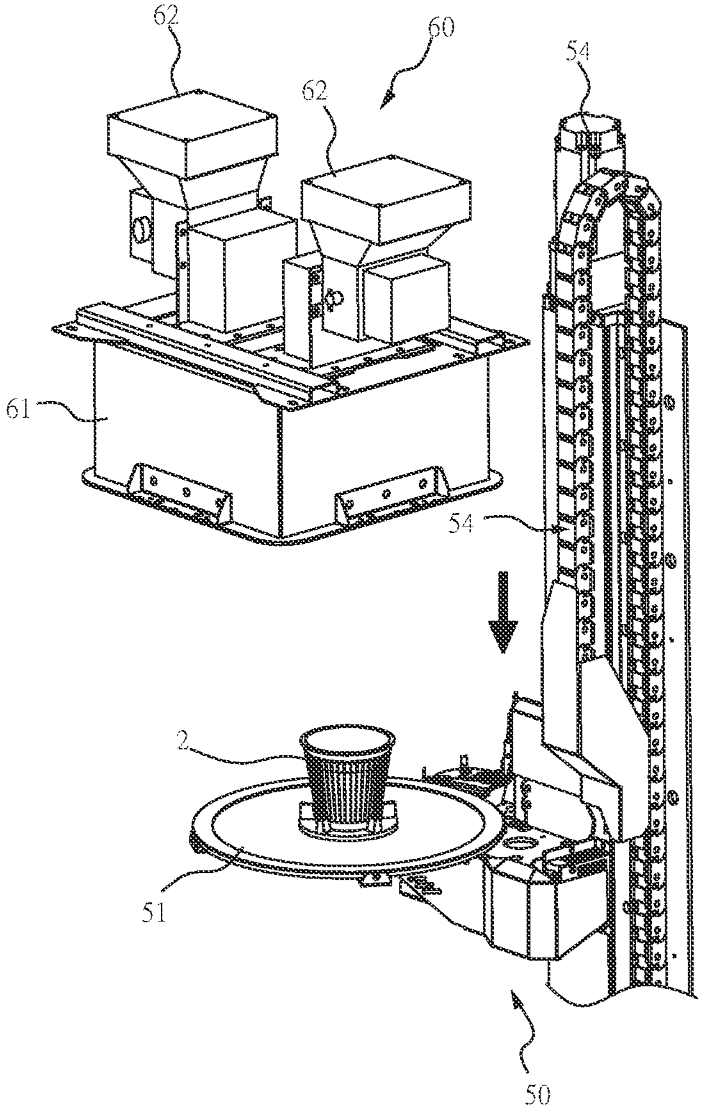
FIG. 9 is a schematic view of operation of the rotating disc mechanism of the automatic heating vending machine of the present invention after the food has been heated.

Referring to FIG. 7, there is shown a schematic view of operation of the rotating disc mechanism of the automatic heating vending machine of the present invention. Referring to FIG. 8, there is shown a schematic view of operation of heating the food with a heating mechanism of the automatic heating vending machine of the present invention. Referring to FIG. 9, there is shown a schematic view of operation of the rotating disc mechanism of the automatic heating vending machine of the present invention after the food has been heated.

At this point in time, the rotating arm 52 rotates the disk 51, and then the disk 51 moves upward to reach the heating mechanism 60. The heating mechanism 60 comprises a casing 61 and a heating module 62. The casing 61 is made of metal and is adapted to contain the food 2. The present invention is not restrictive of the shape of the casing 61; for example, the casing 61 is cuboid or spherical or is of irregular shape. The heating module 62 is disposed above the casing 61 and adapted to heat up the food 2. The heating module 62 carries out the heating process with microwave, infrared or steam, but the present invention is not limited thereto. FIG. 8 shows two heating modules 62, but the present invention is not restrictive of the number of the heating modules 62. After the disk 51 has moved horizontally and vertically, the food 2 enters the casing 61 from below. After that, with the disk 51 being attached to the casing 61, the disk 51 forms the lower flat surface of the casing 61, and thus the casing 61 forms a hermetically sealed space. At this point in time, the heating modules 62 begin carrying out the heating process. Upon completion of the heating process, the disk 51 moves horizontally and vertically again, such that the heated food 2 can move to the exit for the user to take.

The aforesaid modules of the automatic heating vending machine 1 may be hardware devices, software/hardware combo devices, and/or firmware/hardware combo devices, but the present invention is not limited thereto. Furthermore, the aforesaid embodiments serve only to be illustrative of the present invention; thus, for the sake of brevity, not all possible variant embodiments are presented above. However, persons skilled in the art are able to understand that not every aforesaid module and component is necessarily required. Moreover, minor conventional modules and/or components may also be incorporated into the aforesaid embodiments in order to implement the present invention. Any one of the aforesaid modules and components may be dispensed with or altered as needed. Absence of an intervening module or component between any two modules is not necessarily the case.

Therefore, the automatic heating vending machine 1 of the present invention is capable of automatically heating up the food 2 chosen by users and then providing the heated food 2 to the users, thereby sparing the users the hassle of heating the food 2 by themselves.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An automatic heating vending machine, comprising:

a storage space;

a storage mechanism installed in the storage space to store a food;

a fetching mechanism installed in the storage space and disposed under the storage mechanism to catch the food released from the storage mechanism; wherein the fetching mechanism comprises:

a placing position used for placing the released food;

a blocking element disposed near the placing position and adapted to prevent the food from falling;

a rotating mechanism connected to the placing position; and a first driving module;

a gripping arm mechanism disposed on one side of the fetching mechanism and adapted to grip the food on the fetching mechanism; wherein the first driving module is used for controlling the rotating mechanism to rotate to thereby allow the placing position to rotate and come into proximity to the gripping arm mechanisms;

a rotating disc mechanism disposed on one side of the gripping arm mechanism and adapted to undergo horizontal movement and vertical movement, wherein, after gripping the food, the gripping arm mechanism places the food on the rotating disc mechanism; and a heating mechanism disposed above the rotating disc mechanism, wherein after the food has been placed on the rotating disc mechanism, the rotating disc mechanism undergoes horizontal movement and vertical movement, allowing the food to be admitted to the heating mechanism and heated.

2. The automatic heating vending machine as claimed in claim 1, wherein the storage space has an opening deposed between the fetching mechanism and the gripping arm mechanism.

3. The automatic heating vending machine as claimed in claim 1, wherein the storage mechanism comprises a plurality of vertical racks disposed on a ring-shaped support, and a plurality of foods are contained in each said vertical rack.

4. The automatic heating vending machine as claimed in claim 3, wherein the storage mechanism further comprises:

a first clamp disposed on the vertical rack and adapted to clamp the plurality of foods;

a first electromagnet connected to the first clamp and adapted to control the first clamp;

a second clamp disposed under the vertical rack and adapted to release the plurality of foods; and a second electromagnet connected to the second clamp and adapted to control the second clamp, wherein, after one of the foods has been released from the second clamp under the control of the second electromagnet to fall onto the fetching mechanism, the second electromagnet controls the second clamp to restore shape thereof, and then the first electromagnet controls the first clamp to release another food.

5. The automatic heating vending machine as claimed in claim 1, wherein the heating mechanism comprises:

a casing for containing the food; and a heating module disposed above the casing and adapted to heat up the food.

6. The automatic heating vending machine as claimed in claim 1, wherein the fetching mechanism further comprises a plurality of first sensing modules for sensing a position of the placing position.

7. The automatic heating vending machine as claimed in claim 1, wherein the gripping arm mechanism comprises:

a mechanical arm;

a second driving module connected to the mechanical arm to cause the mechanical arm to bend and straighten;

a rail connected to the mechanical arm;

a third driving module disposed at the rail and connected to the mechanical arm, allowing the mechanical arm to move along the rail; and a jaw connected to the mechanical arm, wherein the mechanical arm rotates and moves along the rail, such that the jaw is inserted into the opening to grip the food on the placing position.

8. The automatic heating vending machine as claimed in claim 7, wherein the gripping arm mechanism further comprises a second sensing module disposed near the jaw to detect whether the jaw is gripping the food.

9. The automatic heating vending machine as claimed in claim 1, wherein the rotating disc mechanism comprises:

a disk for anchoring the food;

a rotating arm connected to the disk;

a fourth driving module disposed at the rotating arm and adapted to control the rotating arm to drive the disk to undergo horizontal movement;

an electrically-driven rail vertically extended, wherein the rotating arm is disposed on the electrically-driven rail; and a fifth driving module disposed at the electrically-driven rail and adapted to control the electrically-driven rail, allowing the rotating arm and the disk to undergo vertical movement.

* * * * *